(12) United States Patent
Hayes et al.

(10) Patent No.: US 12,451,769 B2
(45) Date of Patent: Oct. 21, 2025

(54) MULTIPLEXED BI DIRECTIONAL CONVERTERS FOR HYBRID ELECTRIC AIRCRAFT PROPULSION

(71) Applicant: Hamilton Sundstrand Corporation, Charlotte, NC (US)

(72) Inventors: Tyler W. Hayes, Rockford, IL (US); Todd A. Spierling, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/773,709

(22) Filed: Jul. 16, 2024

(65) Prior Publication Data
US 2025/0158491 A1 May 15, 2025

Related U.S. Application Data

(60) Provisional application No. 63/599,069, filed on Nov. 15, 2023.

(51) Int. Cl.
| | | |
|---|---|---|
| *H02K 11/30* | (2016.01) | |
| *B64D 27/02* | (2006.01) | |
| *B64D 27/33* | (2024.01) | |
| *B64D 27/35* | (2024.01) | |
| *F02C 6/20* | (2006.01) | |
| *H02K 7/18* | (2006.01) | |

(52) U.S. Cl.
CPC .......... *H02K 11/30* (2016.01); *B64D 27/026* (2024.01); *B64D 27/33* (2024.01); *B64D 27/35* (2024.01); *F02C 6/20* (2013.01); *H02K 7/1823* (2013.01)

(58) Field of Classification Search
CPC .... H02K 11/30; H02K 7/1823; B64D 27/026; B64D 27/33; B64D 27/35; F02C 6/20
See application file for complete search history.

(56) References Cited

U.S. PATENT DOCUMENTS

| | | | |
|---|---|---|---|
| 10,443,504 B2 | 10/2019 | Dalal | |
| 11,183,956 B2 | 11/2021 | Kheraluwala et al. | |
| 11,401,041 B2 | 8/2022 | Baig et al. | |
| 11,646,579 B2 | 5/2023 | Husband et al. | |
| 11,945,592 B2 | 4/2024 | Salanne et al. | |
| 2020/0215922 A1 | 7/2020 | Sawata et al. | |
| 2021/0281074 A1* | 9/2021 | Joyce | H02H 3/087 |
| 2022/0411082 A1 | 12/2022 | Delbosc et al. | |
| 2024/0084710 A1* | 3/2024 | Trainer | B64D 27/24 |

FOREIGN PATENT DOCUMENTS

| | | | | |
|---|---|---|---|---|
| FR | 3012796 A1 | 5/2015 | | |
| FR | 3141678 A1 | 5/2024 | | |
| FR | 3141680 A1 | 5/2024 | | |
| FR | 3143684 A1 | 6/2024 | | |
| GB | 2630921 A | * 12/2024 | | F02C 7/266 |

OTHER PUBLICATIONS

Search Report issued in European Patent Application No. 24209799.6; Date of Mailing Mar. 31, 2025 (8 pages).

* cited by examiner

*Primary Examiner* — Joseph Ortega
(74) *Attorney, Agent, or Firm* — CANTOR COLBURN LLP

(57) ABSTRACT

A system includes a low pressure machine, a high pressure machine, a motor controller device, a first set of switches configured to selectively couple the low pressure machine to an inverter or a rectifier included in the motor controller device, based on a control signal, and a second set of switches configured to selectively couple the high pressure machine to the inverter or the rectifier, based on the control signal.

15 Claims, 3 Drawing Sheets

MULTIPLEXED BI DIRECTIONAL CONVERTERS FOR HYBRID ELECTRIC AIRCRAFT PROPULSION

CROSS-REFERENCE TO RELATED APPLICATIONS

This application claims the benefit of U.S. Provisional application Ser. No. 63/599,069 filed Nov. 15, 2023, the disclosure of which is incorporated herein by reference in its entirety.

BACKGROUND

The present disclosure relates to aircraft propulsion systems (e.g., aviation or aerospace propulsion systems) and, more particularly, to hybrid aircraft or aerospace propulsion systems and the like.

In some configurations of turbo-electric (hybrid) airplane propulsion systems, electric units such as generators or motors can be attached to the main turbines. These units can generate electricity based on rotation of the turbine shaft and can be used as motors to drive the turbine.

BRIEF DESCRIPTION

Disclosed is a system where a motor control unit (MCU) can be used to drive two separate generators used in a hybrid propulsion system. The MCU can include one or both of a rectifier and an inverter and, thus, in some instances can be bidirectional.

In some examples, a system is provided including: a low pressure machine; a high pressure machine; a motor controller device; a first set of switches configured to selectively couple the low pressure machine to an inverter or a rectifier included in the motor controller device, based on a control signal; and a second set of switches configured to selectively couple the high pressure machine to the inverter or the rectifier, based on the control signal.

In any one or combination of the embodiments disclosed herein, by providing the control signal to the first set of switches and the second set of switches, the motor controller device is configured to: couple the low pressure machine to the inverter or the rectifier, in which the high pressure machine is not coupled to the inverter or the rectifier; or couple the high pressure machine to the inverter or the rectifier, in which the low pressure machine is not coupled to the inverter or the rectifier.

In any one or combination of the embodiments disclosed herein, the system further includes a third set of switches configured to selectively couple the low pressure machine to a second inverter or a second rectifier included in the motor controller device, based on the control signal.

In any one or combination of the embodiments disclosed herein, the third set of switches is configured to selectively couple a 3-phase machine included in the low pressure machine to the second inverter or the second rectifier, based on the control signal.

In any one or combination of the embodiments disclosed herein, the first set of switches is configured to selectively couple a 3-phase machine included in the low pressure machine to the inverter or the rectifier, based on the control signal.

In any one or combination of the embodiments disclosed herein, the first set of switches and the second set of switches are included in the motor controller device.

In any one or combination of the embodiments disclosed herein, the first set of switches and the second set of switches are separate from the motor controller device.

In any one or combination of the embodiments disclosed herein, the system includes a propulsion system of an aircraft.

In any one or combination of the embodiments disclosed herein, the system further includes a generator controller, wherein the motor controller device or the generator controller is configured to provide the control signal.

In some examples, a motor controller device is provided including: a first set of switches configured to selectively couple a low pressure machine of an aircraft to an inverter or a rectifier included in the motor controller device, based on a control signal; and a second set of switches configured to selectively couple a high pressure machine of the aircraft to the inverter or the rectifier, based on the control signal.

In any one or combination of the embodiments disclosed herein, by providing the control signal to the first set of switches and the second set of switches, the motor controller device is configured to: couple the low pressure machine to the inverter or the rectifier, in which the high pressure machine is not coupled to the inverter or the rectifier; or couple the high pressure machine to the inverter or the rectifier, in which the low pressure machine is not coupled to the inverter or the rectifier.

In any one or combination of the embodiments disclosed herein, the motor controller device further includes a third set of switches configured to selectively couple the low pressure machine to a second inverter or a second rectifier included in the motor controller device, based on the control signal.

In any one or combination of the embodiments disclosed herein, the third set of switches is configured to selectively couple a 3-phase machine included in the low pressure machine to the second inverter or the second rectifier, based on the control signal.

In any one or combination of the embodiments disclosed herein, the first set of switches is configured to selectively couple a 3-phase machine included in the low pressure machine to the inverter or the rectifier, based on the control signal.

In any one or combination of the embodiments disclosed herein: the first set of switches is configured to selectively isolate the low pressure machine from the motor controller device and an electrical network including the inverter and the rectifier; and the second set of switches is configured to selectively isolate the high pressure machine from the motor controller device and the electrical network including the inverter and the rectifier.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of example and not limitation with reference to the Figures. While the current application is directed to driving/regulating generators/motors, FIG. 1 is provided for context.

Figure 1:
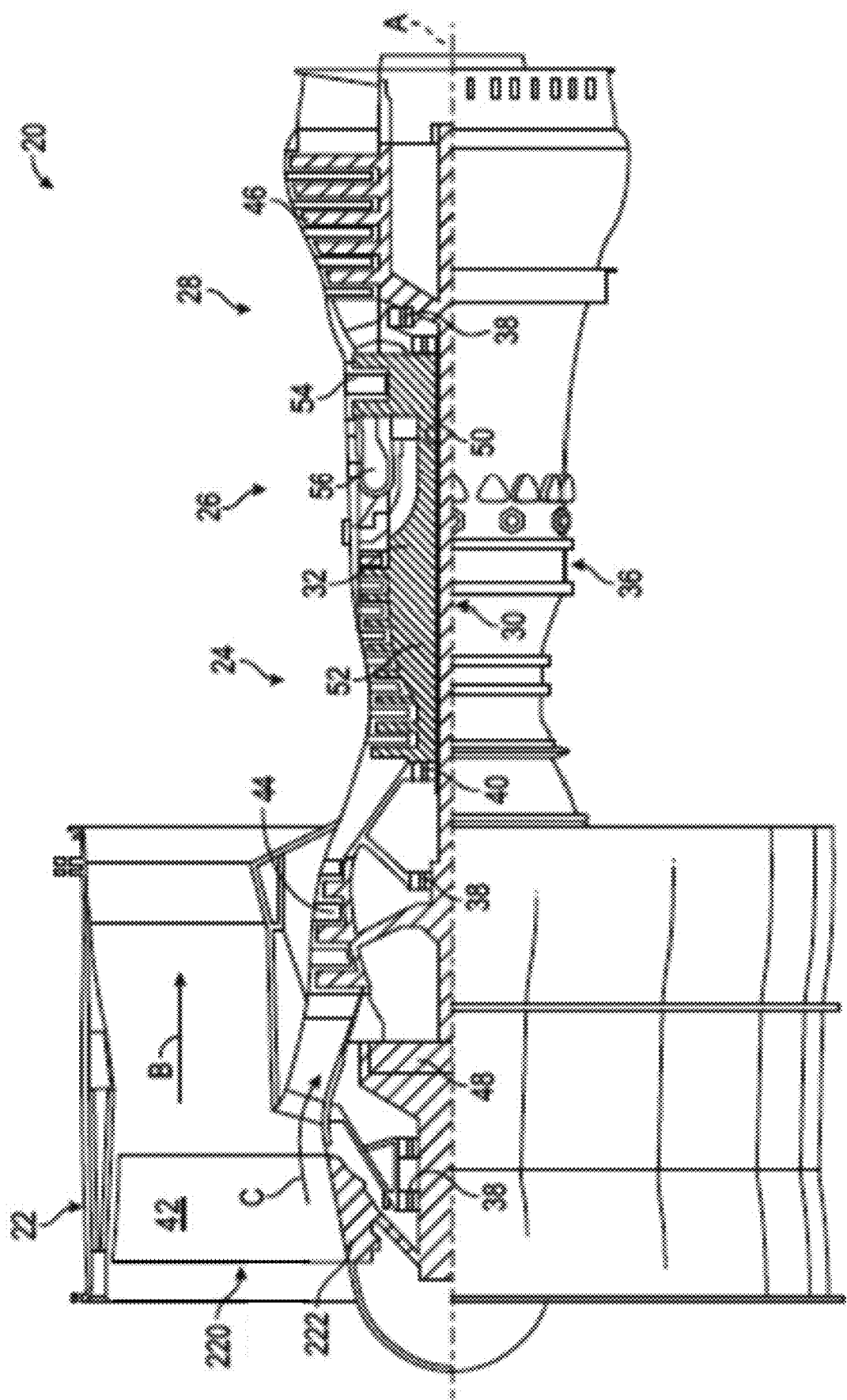
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans, and the teachings may be applied to other types of turbine engines including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in gas turbine engine 20 is illustrated as a geared architecture 48 to drive the fan 42 at a lower speed than the low speed spool 30.

The high speed spool 32 includes an outer shaft 50 that interconnects a high pressure compressor 52 and high pressure turbine 54. A combustor 56 is arranged in gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

One or more electrical machines (e.g., generators/motors) can be attached to both the low speed spool and the high speed spool. Herein, an electrical machine connected to the low speed spool shall be referred to as a low pressure machine, and an electrical machine connected to the high speed spool shall be referred to as a high pressure machine. The skilled artisan will understand that the connection can be made, for example, by rotor blades on the low speed spool and that similar connections can be made on the high speed spool.

Figure 2:
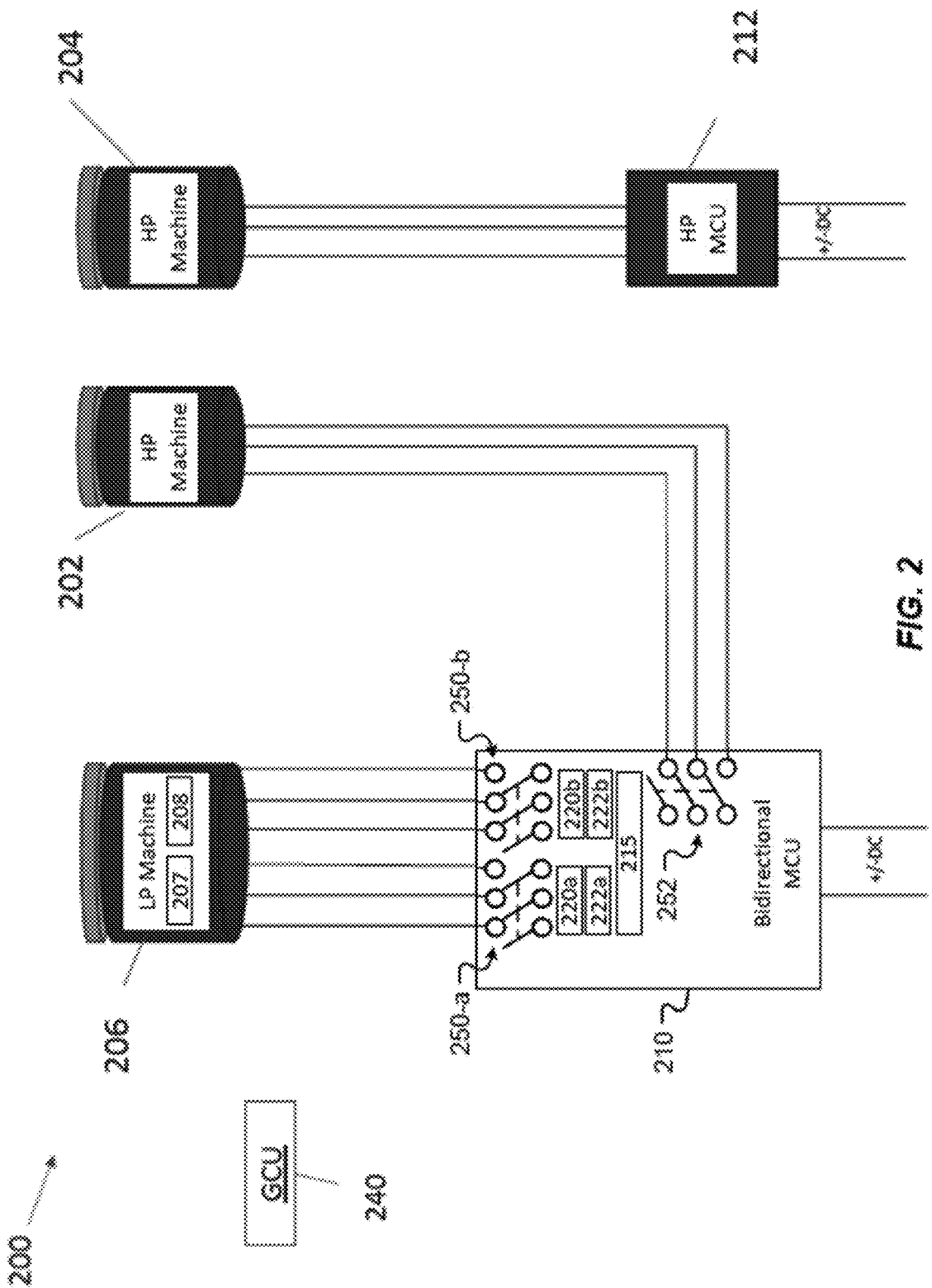
FIG. 2 shows an example system according to one embodiment where a single MCU is selectively connected to and controls/or receives power from a high pressure spool motor/generator and a low pressure spool motor/generator.

With reference now to FIG. 2, an example system 200 in accordance with one or more embodiments of the present disclosure is shown. As illustrated, the system 200 includes two high pressure machines, a first high pressure machine 202 and a second high pressure machine 204. In some embodiments, the second high pressure machine 204 can be omitted. In some other embodiments, the system 200 may further include one or more additional second high pressure machines 204.

The system 200 also includes a low pressure machine 206. In some other embodiments, the system 200 may further include one or more additional low pressure machines 206. For example, the system 200 may include the low pressure machine 206, the first high pressure machine 202, and another low pressure machine 206 (not illustrated) and corresponding MCU (not illustrated).

The system further includes a first bidirectional MCU 210 (also referred to herein as a control device, an MCU, or a bidirectional MCU). As described herein, the first bidirectional MCU 210 is capable of driving separate generators and motors used in a propulsion system (e.g., a hybrid propulsion system). In the example descriptions herein, the first bidirectional MCU 210 is described with reference to driving two separate generators (e.g., first high pressure machine 202, low pressure machine 206), but embodiments of the present disclosure are not limited thereto. For example, aspects of the first bidirectional MCU 210 support driving any suitable quantity of generators and any suitable quantity of motors used in a propulsion system. Descriptions herein with respect to a generator (or separate generators) may similarly be applied to a motor (or separate motors).

The first bidirectional MCU 210 can be configured such that the first bidirectional MCU 210 can control either the first high pressure machine 202 or the low pressure machine 206. To that end, the first bidirectional MCU 210 can include an inverter that receives DC power and converts to AC power so as to cause the first high pressure machine 202 or the low pressure machine 206 to operate in a motor configuration and provide energy to the turbine of FIG. 1. In one embodiment, the first bidirectional MCU 210 can include a separate inverter for each of the first high pressure machine 202 and the low pressure machine 206, as indicated by inverters 220a, 220b. Each inverter 220a, 220b can be active and can be controlled to produce a desired output by either an internal controller or by an external controller such as, for example, generator control unit (GCU) 240 (also referred to herein as a generator controller) shown in FIG. 2.

The first bidirectional MCU 210 can also be configured such that the first bidirectional MCU 210 can convert AC power received from either the first high pressure machine 202 or the low pressure machine 206 and output a DC voltage from the conversion. To that end, the first bidirectional MCU 210 can include a rectifier that receives AC power from the first high pressure machine 202 or the low pressure machine 206 and converts it to DC power. In one embodiment, the first bidirectional MCU 210 can include a separate rectifier for each of the first high pressure machine 202 and the low pressure machine 206, as indicated by rectifiers 222a, 222b but only could be included in one embodiment. Each rectifier 222a, 222b can be active and can be controlled to produce a desired output by either an internal controller or by an external controller such as, for example, GCU 240 shown in FIG. 2.

As shown, the first bidirectional MCU 210 includes a first and second switch sets 250, 252 capable of selectively connecting components as described herein. The first switch set 250-a connects the first bidirectional MCU 210 to the low pressure machine 206, the second switch set 250-b connects the first bidirectional MCU 210 to the low pressure machine 206, and the third switch set 252 connects the first bidirectional MCU 210 to the first high pressure machine 202. It shall be understood that embodiments of the present disclosure support configuring the first bidirectional MCU 210 such that the first bidirectional MCU 210 is connected to one of the first high pressure machine 202 or the low pressure machine 206 at a given time. Further, based on the operating condition that is desired, the first bidirectional MCU 210 may connect the selected machine 202, 206 to either the inverter or the rectifier. The terms "connect," "couple," "electrically couple," and "electrically connect" may be used interchangeably herein.

In an example, based on a first operating condition (e.g., receiving DC power and converting to AC power), the first bidirectional MCU 210 may connect the low pressure machine 206 to inverters 220a and/or inverters 220b. In another example, based on a second operating condition (e.g., receiving AC power and converting to DC power), the first bidirectional MCU 210 may connect the low pressure machine 206 to rectifiers 222a and/or rectifiers 222b. In an example, based on a third operating condition (e.g., receiving DC power and converting to AC power), the first bidirectional MCU 210 may connect the first high pressure machine 202 to inverters 220b. In another example, based on a fourth operating condition (e.g., receiving AC power and converting to DC power), the first bidirectional MCU 210 may connect the first high pressure machine 202 to rectifiers 222b.

In some aspects, the switch sets 250 (e.g., first switch set 250-a, second switch set 250-b) and switch set 252 may support configurations in which a single generator (e.g., first 3-phase machine 207, second 3-phase machine 208, first high pressure machine 202) is interacting with the first bidirectional MCU 210 at a given time. The first bidirectional MCU 210 may receive a command from a system controller via a communication bus or hard wire included in the system 200 to indicate to the first bidirectional MCU 210 that the switch sets 250 and/or switch set 252 are to change states. Based on the command, the first bidirectional MCU 210 may provide control signals (not illustrated) to the switch sets 250 (e.g., first switch set 250-a, second switch set 250-b) and/or switch set 252 in association with changing the states of the switch sets 250 and/or switch set 252. For example, the first bidirectional MCU 210 may provide control signals (not illustrated) to the switch sets 250 (e.g., first switch set 250-a, second switch set 250-b) and switch set 252 in association with connecting a given generator (e.g., first 3-phase machine 207, second 3-phase machine 208, first high pressure machine 202) to and disconnecting another generator from an inverter or rectifier as described herein. Accordingly, for example, the first bidirectional MCU 210 and the system controller (e.g., GCU 240) may be configured to provide control signals to the switch sets 250 (e.g., first switch set 250-a, second switch set 250-b) and switch set 252.

The switch sets 250 (e.g., first switch set 250-a, second switch set 250-b) and switch sets 252 described herein can be located in or outside the first bidirectional MCU 210. In an example, each of the first switch set 250-a, second switch set 250-b, and switch set 252 may be included in an enclosure, circuit board, or the like associated with the first bidirectional MCU 210. In an example in which the switch sets 250 and switch set 252 are implemented in the first bidirectional MCU 210, the switch sets 250 and switch set 252 may be separate from or part of multiplexer circuitry 215 included in the first bidirectional MCU 210.

In another example, the switch sets 250 and switch set 252 may be located outside of the first bidirectional MCU 210, example aspects of which are later described with reference to FIG. 3. For example, each of the first switch set 250-a, second switch set 250-b, and switch set 252 may be implemented in a respective enclosure 251 (also referred to herein as a housing), circuit board, or the like separate from an enclosure, the circuit board, or the like associated with the first bidirectional MCU 210.

In some implementations, some of the switch sets 250 (e.g., first switch set 250-a, second switch set 250-b) and switch sets 252 may be located in the first bidirectional MCU 210 and remaining ones of the switch sets may be located outside the first bidirectional MCU 210.

It is noted that in embodiments, the second high pressure machine 204 can be connected to its own MCU 212. In some embodiments, the MCU 212 may include aspects of the first bidirectional MCU 210 described herein. For example, the MCU 212 may include (as described with reference to FIG. 2) or be connected to (e.g., as described with reference to FIG. 3) switches configured to multiplex with available machines (e.g., high pressure machines, low pressure machines) included in the system 200. Repeated descriptions of like elements are omitted for brevity.

Further, as shown, the low pressure machine 206 is shown as having 6 connections but that is just by way example. In the non-limiting example shown, the low pressure machine 206 is a parallel fed 3-phase machine. That is, for example, the low pressure machine 206 may be include two 3-phase machines (i.e., including 3 phase windings) which are independent of one another.

Similarly, for example, the high pressure machines 202, 204 are illustrated as 3-phase machines but can include more connections as desired.

As will be evident from the disclosure provided herein, the first bidirectional MCU 210 can multiplex connections for the first high pressure machine 202 and/or the low pressure machine 206. For example, the first bidirectional MCU 210 may include multiplexer circuitry 215 supportive of establishing connections between the low pressure machine 206 (e.g., first 3-phase machine 207, second 3-phase machine 308) and any of the inverters 220a, rectifiers 222a, inverters 220b, and rectifiers 222b. The multiplexer circuitry 215 may support establishing connections between the first high pressure machine 202 and any of the inverters 220a, rectifiers 222a, inverters 220b, and rectifiers 222b.

In an example, the first bidirectional MCU 210 and included multiplexer circuitry 215 (e.g., including switch set 250-a) may be configured to connect the first 3-phase machine 207 included in the low pressure machine 206 to inverters 220a or rectifiers 222a.

In another example, the first bidirectional MCU 210 and included multiplexer circuitry 215 (e.g., including switch set 250-b) may be configured to connect the second 3-phase machine 208 included in the low pressure machine 206 to inverters 220b or rectifiers 222b.

In another example, the first bidirectional MCU 210 and included multiplexer circuitry 215 (e.g., including switch set 252) may be configured to connect the first high pressure machine 202 to inverters 220b or rectifiers 222b.

The systems and techniques described herein can allow for both power generation or electrified (hybrid) flight in combination with an aircraft engine (turbine) or other vehicle engine. To that end, the bidirectional MCU 210 can be both a motor controller (inverter) and an active rectifier. When operating as a motor controller, the bidirectional MCU 210 converts direct current into alternating current. When operating as a rectifier (e.g., the electric machines are operating as generators), the MCU 210 can convert AC power into DC power. By being able to control both machines, a single MCU 210 can be provided in a system where only one converter is required to run two separate electric machines at different times.

As will be understood, two bidirectional converters (motor controller/active rectifier) used to motor or generate with two independent electric machines (e.g., low pressure machine 206, first high pressure machine 202) for electrified flight can be simplified down to a single bidirectional converter (e.g., first bidirectional MCU 210 described herein) that is switched into one of the two electric machines when the electric machine is desired to be used.

By providing a single converter with switchgear (contactors) (e.g., switch sets 250, switch set 252) to either motor/generate for independent electric machines, the systems and techniques described herein support a reduction in weight and cost compared to some other systems by removing the need for an independent converter. For example, some other systems may include independent MCUs respective to each of the low pressure machine 206 and the first high pressure machine 202. In another example, some other systems may include three sets of inverters and rectifiers (not illustrated), in which the first set of inverters and rectifiers is allocated for the first 3-phase machine 207 of the low pressure machine 206, the second set of inverters and rectifiers is allocated for the second 3-phase machine 208 of the low pressure machine 206, and the third set of inverters and rectifiers is allocated for the first high pressure machine 202. The systems and techniques described herein support a reduced quantity of MCUs, inverters, and rectifiers.

The systems and techniques described herein support an increased reliability of the system, as aspects of the first bidirectional MCU 210 and switching techniques support swapping in a converter for cases in which an existing converter fails. The system 200 may include a system control (e.g., GCU 240 or another controller) capable of directing the first bidirectional MCU 210 (converter) to open or close the contactors and to engage with the required electric machine through a commanded set of contactors. The switchgear can be integrated in the first bidirectional MCU 210 (bidirectional converter) as illustrated at FIG. 2 or federated (outside) as illustrated at FIG. 3.

With respect to the example system 200 described with reference to FIG. 2, implementing the switchgear/contactors (e.g., switch sets 250 and switch set 252) inside the first bidirectional MCU 210 may benefit from existing cooling, control wiring, and control circuitry provided by the first bidirectional MCU 210.

In some aspects, opening the switchgear/contactors (e.g., switch sets 250 and switch set 252) may provide a protection function which isolates a motor fully from the first bidirectional MCU 210 and an electrical network of the first bidirectional MCU 210. For example, the switch sets 250 are configured to selectively isolate the low pressure machine 206 from the first bidirectional MCU 210 and an electrical network of the first bidirectional MCU 210, in which the electrical network includes the inverters 220 and the rectifiers 222. In another example, the switch set 252 is configured to selectively isolate the first high pressure machine 202 from the first bidirectional MCU 210 and the electrical network of the first bidirectional MCU 210.

Figure 3:
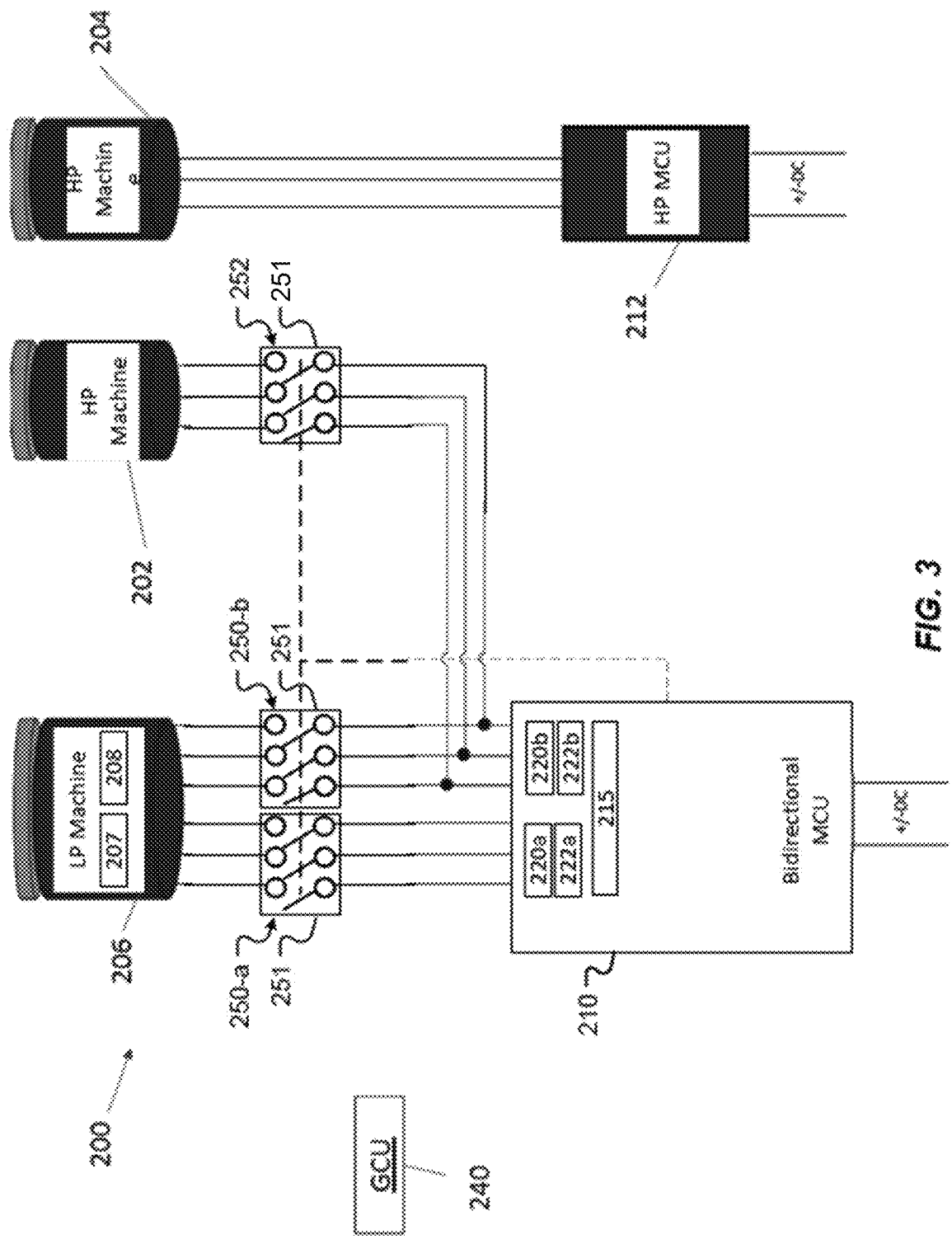
FIG. 3 shows another example system according to one embodiment where a single MCU is selectively connected to and controls/or receives power from a high pressure spool motor/generator and a low pressure spool motor/generator, where the switching elements are outside of the MCU.

FIG. 3 illustrates an example system 300 in accordance with one or more embodiments of the present disclosure. The system 300 includes aspects of system 200 described herein, and repeated descriptions of like elements are omitted for brevity. Referring to FIG. 3, the system 300 may include switch sets 250 and switch sets 252 described with reference to FIG. 2, in which the switch sets 250 and switch sets 252 are implemented outside of the first bidirectional MCU 210.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an example embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
    a low pressure machine;
    a high pressure machine;
    a motor controller device;
    a first set of switches configured to selectively couple the low pressure machine to an inverter or a rectifier based on a control signal, wherein the inverter and the rectifier are comprised in the motor controller device; and
    a second set of switches configured to selectively couple the high pressure machine to the inverter or the rectifier, based on the control signal.

2. The system of claim 1, wherein, by providing the control signal to the first set of switches and the second set of switches, the motor controller device is configured to:
    couple the low pressure machine to the inverter or the rectifier, in which the high pressure machine is not coupled to the inverter or the rectifier; or couple the high pressure machine to the inverter or the rectifier, in which the low pressure machine is not coupled to the inverter or the rectifier.

3. The system of claim 1, further comprising a third set of switches configured to selectively couple the low pressure machine to a second inverter or a second rectifier based on the control signal, wherein the second inverter and the second rectifier are comprised in the motor controller device.

4. The system of claim 3, wherein the third set of switches is configured to selectively couple a 3-phase machine comprised in the low pressure machine to the second inverter or the second rectifier, based on the control signal.

5. The system of claim 1, wherein the first set of switches is configured to selectively couple a 3-phase machine comprised in the low pressure machine to the inverter or the rectifier, based on the control signal.

6. The system of claim 1, wherein the first set of switches and the second set of switches are comprised in the motor controller device.

7. The system of claim 1, wherein the first set of switches and the second set of switches are separate from the motor controller device.

8. The system of claim 1, wherein the system comprises a propulsion system of an aircraft.

9. The system of claim 1, further comprising a generator controller, wherein the motor controller device or the generator controller is configured to provide the control signal.

10. A motor controller device comprising:
a first set of switches configured to selectively couple a low pressure machine of an aircraft to an inverter or a rectifier based on a control signal, wherein the inverter and the rectifier are comprised in the motor controller device; and
a second set of switches configured to selectively couple a high pressure machine of the aircraft to the inverter or the rectifier, based on the control signal.

11. The motor controller device of claim 10, wherein, by providing the control signal to the first set of switches and the second set of switches, the motor controller device is configured to:
couple the low pressure machine to the inverter or the rectifier, in which the high pressure machine is not coupled to the inverter or the rectifier; or
couple the high pressure machine to the inverter or the rectifier, in which the low pressure machine is not coupled to the inverter or the rectifier.

12. The motor controller device of claim 10, wherein the motor controller device further comprises a third set of switches configured to selectively couple the low pressure machine to a second inverter or a second rectifier based on the control signal, wherein the second inverter and the second rectifier are comprised in the motor controller device.

13. The motor controller device of claim 12, wherein the third set of switches is configured to selectively couple a 3-phase machine comprised in the low pressure machine to the second inverter or the second rectifier, based on the control signal.

14. The motor controller device of claim 10, wherein the first set of switches is configured to selectively couple a 3-phase machine comprised in the low pressure machine to the inverter or the rectifier, based on the control signal.

15. The motor controller device of claim 10, wherein:
the first set of switches is configured to selectively isolate the low pressure machine from the motor controller device and an electrical network comprising the inverter and the rectifier; and
the second set of switches is configured to selectively isolate the high pressure machine from the motor controller device and the electrical network comprising the inverter and the rectifier.

\* \* \* \* \*